United States Patent
Tamogami et al.

(10) Patent No.: US 10,611,049 B2
(45) Date of Patent: Apr. 7, 2020

(54) AQUEOUS BONDING COMPOSITION

(71) Applicant: HENKEL AG & CO. KGAA, Duesseldorf (DE)

(72) Inventors: Tsuyoshi Tamogami, Osaka (JP); Yoshio Yoshida, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 16/130,134

(22) Filed: Sep. 13, 2018

(65) Prior Publication Data

US 2019/0009427 A1 Jan. 10, 2019

Related U.S. Application Data

(63) Continuation of application No. PCT/JP2017/006558, filed on Feb. 22, 2017.

(30) Foreign Application Priority Data

Mar. 28, 2016 (JP) .................. 2016-063804

(51) Int. Cl.
| | | |
|---|---|---|
| *B27N 3/00* | (2006.01) | |
| *C13B 50/00* | (2011.01) | |
| *C08L 29/04* | (2006.01) | |
| *C08K 3/16* | (2006.01) | |
| *C09J 105/00* | (2006.01) | |
| *B27N 1/02* | (2006.01) | |
| *C08K 3/28* | (2006.01) | |
| *C08K 3/32* | (2006.01) | |
| *C08K 5/1535* | (2006.01) | |

(52) U.S. Cl.
CPC ........... *B27N 3/002* (2013.01); *B27N 1/0209* (2013.01); *C08K 3/16* (2013.01); *C08K 3/28* (2013.01); *C08K 3/32* (2013.01); *C08K 5/1535* (2013.01); *C08L 29/04* (2013.01); *C09J 105/00* (2013.01); *C13B 50/006* (2013.01); *C08K 2003/166* (2013.01); *C08K 2003/322* (2013.01); *C08L 2201/54* (2013.01)

(58) Field of Classification Search
CPC .... B27N 3/002; B27N 1/0209; C08K 5/1535; C08K 3/16; C08K 2003/322; C08K 3/32; C08K 3/28; C08L 29/04; C08L 2201/54
See application file for complete search history.

(56) References Cited

U.S. PATENT DOCUMENTS

| | | |
|---|---|---|
| 2,489,170 A | 11/1949 | Wooster et al. |
| 2,818,397 A | 12/1957 | Casebolt |
| 3,395,033 A | 7/1968 | Remer |
| 7,888,445 B2 | 2/2011 | Swift et al. |
| 2006/0128840 A1 | 6/2006 | Graux et al. |
| 2012/0231990 A1* | 9/2012 | Besse ....................... C11D 3/10 510/445 |

FOREIGN PATENT DOCUMENTS

| | | |
|---|---|---|
| GB | 527704 A | 10/1940 |
| JP | 2009-503193 A | 1/2009 |
| JP | 2012-214687 A | 11/2012 |
| WO | 2007014236 A2 | 2/2007 |
| WO | 2012133219 A1 | 10/2012 |
| WO | 2015072437 A1 | 5/2015 |

* cited by examiner

*Primary Examiner* — Robert D Harlan
(74) *Attorney, Agent, or Firm* — Sun Hee Lehmann

(57) ABSTRACT

Disclosed is an aqueous bonding composition comprising: (A) a saccharide; (B) a water-soluble synthetic resin; and (C) an inorganic acid ammonium salt, wherein the inorganic acid ammonium salt (C) comprises at least one selected from ammonium dihydrogen phosphate and ammonium chloride. The water-soluble synthetic resin (B) preferably comprises a polyvinyl alcohol-based compound. A wood-based material obtainable by using the aqueous bonding composition is also disclosed. The aqueous bonding composition is useful for improving performances such as bending strength, bending strength under wet condition, water-absorption thickness expansion coefficient, and peeling strength of a wood-based material in a balanced manner while the composition is capable of bonding at a comparatively low temperature and each component of the composition is excellent in compatibility.

4 Claims, No Drawings

AQUEOUS BONDING COMPOSITION

CROSS-REFERENCE TO RELATED APPLICATIONS

This application is a continuation of International Patent Application No. PCT/JP2017/006558 filed Feb. 22, 2017, which claims the benefit of Japanese Patent Application No. 2016-063804 filed on Mar. 28, 2016, the contents of both of which are incorporated herein by reference in its entirety.

TECHNICAL FIELD OF THE INVENTION

The present invention relates to an aqueous bonding composition capable of producing an aqueous adhesive, and a wood-based material which is producible by using the aqueous bonding composition.

BACKGROUND OF THE INVENTION

Wood-based materials (for example, plywoods (veneer board, etc.), particle boards, fiber boards (medium density fiberboard: MDF, etc.), and laminated woods) are generally produced by applying or spraying an adhesive etc. onto wood-based elements (raw materials) (for example, various sizes of fibers, small pieces, and veneers obtainable by finely dividing woods or herbaceous plants), followed by molding the wood-based elements through pressurizing and heating. The wood-based materials are natural regenerable (or renewable) materials, in which stabilities of the strength and the size are enhanced and thus defects peculiar to woods are removed while utilizing advantages of the woods. From the viewpoint of the protection of the earth environment, the protection of workers producing the wood-based materials, and the prevention of sick house syndrome, there have been developed, as the adhesive to be used, an aqueous adhesive which does not cause diffusion of formaldehyde and contains no organic solvent.

When the wood-based material (for example, particle board) is produced using a urea resin and a phenol resin, a mixture of a wood-based element with an adhesive is generally heated at a temperature of about 130 to 170° C. and molded. Therefore, it is preferable that an aqueous adhesive is also heated to approximately the same temperature, thus making it possible to produce the wood-based material. However, when using the aqueous adhesive, higher temperature is often needed.

There is also a need that the wood-based material thus obtained (for example, particle board) is excellent in performances such as bending strength, bending strength under wet condition, water-absorption thickness expansion coefficient, and peeling strength. However, when using the aqueous adhesive, the performances are often unsatisfactory.

Patent Literature 1 discloses an aqueous binder comprising a reducing saccharide such as dextrose, and an ammonium carboxylate such as triammonium citrate (see CLAIMS and Table 1 in [0131], etc.). This aqueous binder is employed to produce a fiber glass and a wood-based fiber board (see [0016] to [0017], etc.). However, since the fiber glass and the wood-based fiber board of Patent Literature 1 have a lower bending strength under wet condition and a higher water-absorption thickness expansion coefficient, it cannot be said that they are suited for a structural material which is required to have severe moisture resistance.

Patent Literature 2 discloses a bonding composition comprising a saccharide (sucrose, maltose, etc.) and a polycarboxylic acid (citric acid, malic acid, maleic anhydride, polymaleic acid, polyacrylic acid, etc.) in which formaldehyde is hard to diffuse (see Claims 1 and 2, [0031] to [0032], etc.). Patent Literature 2 further discloses production of a wood-based board using the composition (see [0126], etc.). Patent Literature 2 discloses that the bonding composition comprises a thickener (see Claims 4 and 13, [0046], etc.), and the bonding composition comprising a thickener is specifically disclosed in Table 5.

The bonding composition of Patent Literature 2 comprises the polycarboxylic acid to improve joint power between woods. However, the wood-based board of Patent Literature 2 also has an unsatisfactory bending strength under wet condition and an unsatisfactory water-absorption thickness expansion coefficient, and is not suited for a structural material which is required to have severe moisture resistance.

CITATION LIST

Patent Literature

[PLT 1] JP 2009-503193 A
[PLT 2] JP 2012-214687 A

SUMMARY OF THE INVENTION

Technical Problem

Recently, it has been required that the aqueous adhesive used for producing the wood-based material improves performances such as bending strength, bending strength under wet condition, water-absorption thickness expansion coefficient, and peeling strength of the wood-based material in a balanced manner while the adhesive being capable of bonding at a comparatively low temperature.

Furthermore, when the structural material such as molded board is produced by mixing the aqueous bonding composition with various base materials, considering the production efficiency of the structural material, it is preferably required that the aqueous bonding composition has excellent compatibility of each component and can be easily sprayed without clogging an injection device such as spray.

In light of these circumstances, the present invention has been made and an object thereof is to provide an aqueous bonding composition which is useful for improving performances such as bending strength, bending strength under wet condition, water-absorption thickness expansion coefficient, and peeling strength of a wood-based material in a balanced manner while the composition is capable of bonding at a comparatively low temperature and each component of the composition is excellent in compatibility; and is to provide the wood-based material which is obtainable by using the aqueous bonding composition.

Solution to Problem

As a result of continued intensive study, the present inventors have found that an aqueous bonding composition comprising a saccharide, a water-soluble synthetic resin, and a specific ammonium salt of an inorganic acid is useful for improving performances such as bending strength, bending strength under wet condition, water-absorption thickness expansion coefficient, and peeling strength of a wood-based material in a balanced manner while the composition is capable of bonding at a comparatively low temperature and each component of the composition is excellent in compatibility, thus completing the present invention.

DETAILED DESCRIPTION OF THE INVENTION

The present invention provides, in an aspect, an aqueous bonding composition comprising:
(A) a saccharide; (B) a water-soluble synthetic resin; and (C) an inorganic acid ammonium salt, and
wherein the inorganic acid ammonium salt (C) comprises at least one selected from ammonium dihydrogen phosphate and ammonium chloride.

The present invention provides, in an embodiment, an aqueous bonding composition, wherein the water-soluble synthetic resin (B) comprises a polyvinyl alcohol-based compound.

The present invention provides, in another embodiment, an aqueous bonding composition, which further comprises (D) a metal salt, and wherein the metal salt (D) comprises magnesium chloride.

The present invention provides, in a further embodiment, an aqueous bonding composition, which comprises the water-soluble synthetic resin (B) in an amount of 5 to 20 parts by weight based on 100 parts by weight of the total weight of the components (A) to (D).

The present invention provides, in another aspect, a wood-based material comprising the aqueous bonding composition and a wood-based element.

Advantageous Effects of Invention

The aqueous bonding composition according to an embodiment of the present invention comprises (A) a saccharide, (B) a water-soluble synthetic resin, and (C) an inorganic acid ammonium salt, and the inorganic acid ammonium salt (C) comprises at least one selected from ammonium dihydrogen phosphate and ammonium chloride, and therefore the compatibility of each component is improved and the composition is capable of bonding at a comparatively low temperature. Furthermore, the composition can be preferably sprayed using a spray.

Processing, molding, and curing a material coated with the aqueous bonding composition of the present invention can give a material excellent in balance among performances such as bending strength, bending strength under wet condition, water-absorption thickness expansion coefficient, and peeling strength.

Considering performances of the materials which is cured, the aqueous bonding composition of the present invention is useful to produce various materials and is the most suitable for the production of a wood-based material.

Description of Embodiments

An aqueous bonding composition according to an embodiment of the present invention comprises (A) a saccharide, (B) a water-soluble synthetic resin, and (C) an inorganic acid ammonium salt.

In the present invention, the "(A) saccharide" is generally called a saccharide and is not particularly limited as long as the objective aqueous bonding composition of the present invention is obtainable. The saccharide (A) includes, for example, monosaccharide, disaccharide, trisaccharide, tetrasaccharide, polysaccharide, and other oligosaccharides.

Specific examples of the "monosaccharide" include the followings:
hexoses such as glucose, psicose, fructose, sorbose, tagatose, allose, altrose, mannose, gulose, idose, galactose, talose, fucose, fuculose, and rhamnose;
trioses such as ketotriose (dihydroxyacetone) and aldotriose (glyceraldehyde);
tetroses such as erythrulose, erythrose, and threose; and
pentoses such as ribulose, xylulose, ribose, arabinose, xylose, lixose, and deoxyribose.

Examples of the "disaccharide" include sucrose, lactose, maltose, trehalose, turanose, and cellobiose.

Examples of the "trisaccharide" include raffinose, melezitose, maltotriose, and 1-kestose (GF2).

Examples of the "tetrasaccharide" include acarbose, stachyose, and nystose (GF3).

Examples of the "polysaccharide" include glycogen, starch (amylose, amylopectin, etc.), cellulose, dextrin, glucan, N-acetylglucosamine, chitin, and inulin (including fructofuranosylnystose: GF4).

Examples of the "other oligosaccharides" include fructooligosaccharide, galactooligosaccharide, and mannan oligosaccharide.

These "saccharide(s)" can be used alone or in combination.

The "saccharide" preferably comprises a structure derived from fructose. Examples of the saccharide can include fructose itself, sucrose, and inulin.

The inulin usually refers to a polymer of fructose, comprising glucose linked to the end of the polymer. Therefore, the inulin includes, for example, 1-kestose (GF2) classified into the simplest trisaccharide, nystose (GF3) included in the tetrasaccharide, fructofuranosylnystose (GF4) included in the polysaccharide, and the like. The 1-kestose is composed of two fructoses and one glucose, while the nystose is composed of three fructoses and one glucose.

The saccharide (A) can further comprise, for example, a sugar syrup. The "sugar syrup" means a syrup prepared by removing dietary fibers and impurities from sugar raw materials such as sugarcane, sugar beet, sugar maple, and Palmyra palm, or a viscous liquid (molasses) also comprising components other than sugar, which is obtainable when sugar is purified from raw materials.

The sugar syrup comprises, for example, waste molasses, ice molasses, white honey, caramel, crude saccharide, sugar solution, and squeezed juice of the sugar raw materials (sugarcane, sugar beet, sugar maple, and Palmyra palm etc.).

The sugar syrup preferably comprises at least one selected from waste molasses, ice molasses, and crude saccharide.

The aqueous bonding composition of the present invention comprises a saccharide (A), and therefore a material obtainable by being coated with the aqueous bonding composition and cured is excellent in bending strength, bending strength under wet condition, water-absorption thickness expansion coefficient, and peeling strength, and is particularly excellent in bending strength under wet condition and water-absorption thickness expansion coefficient.

When the "saccharide" comprises a structure derived from fructose, the aqueous bonding composition of the present invention is more excellent in water resistance. Therefore, regarding the wood-based material of the present invention, the bending strength under wet condition can further increase and the water-absorption thickness expansion coefficient can further decrease.

It is possible to use commercially available products as the "saccharide".

In the present invention, the water-soluble synthetic resin (B) means a polymer which can be dissolved in an aqueous medium and which is artificially produced. Therefore, starch, saccharide, agar, gelatin, and glue are not included in the water-soluble synthetic resin (B) because they are naturally (plant or animal)-derived polymers.

The "aqueous medium" as used herein means so-called water such as distilled water, deionized water, and pure water, and can include a, water-soluble organic solvent, for example, acetone, lower alcohol, and the like.

Examples of the water-soluble synthetic resin (B) include the following:

nonionic water-soluble polymers such as polyvinyl alcohol, polyacrylamide, polyvinylpyrrolidone, and polyethylene glycol;

anionic water-soluble polymers such as sodium polyacrylate and sodium polysulfonate;

cationic water-soluble polymers such as polymers of diallyldimethylammonium salts and polyethylenimine.

These water-soluble synthetic resin(s) can be used alone or in combination.

Ethylene glycol and diethylene glycol are not comprised in the water-soluble synthetic resin (B) because they are not polymers but monomers.

Dimers and trimers as used herein are not considered as polymers, and not comprised in the water-soluble synthetic resin (B).

In the present invention, the water-soluble synthetic resin (B) preferably comprises a polyvinyl alcohol-based compound. Examples of the polyvinyl alcohol-based compound comprise polyvinyl alcohol, modified (or denatured) polyvinyl alcohol, and the like.

The "polyvinyl alcohol" is generally produced by hydrolyzing polyvinyl acetate, and can comprise an acetate group ($CH_3COO$—).

The "modified polyvinyl alcohol" as used herein means a polyvinyl alcohol modified (or denatured) by adding a new functional group (preferably hydrophilic group). The modified polyvinyl alcohol can be produced by modifying a polyvinyl alcohol by adding a new functional group (preferably hydrophilic group) during or after synthesis of the polyvinyl alcohol.

Examples of the modified polyvinyl alcohol include butenediol-modified polyvinyl alcohol, sulfonic acid-modified polyvinyl alcohol, acetoacetyl group-modified polyvinyl alcohol, carboxylic acid-modified polyvinyl alcohol, amino group-modified polyvinyl alcohol, and the like.

The aqueous bonding composition of the present invention has a water-soluble synthetic resin (B), and therefore has more excellent curability, thus making it possible to further improve bonding properties (bending strength under wet condition and water-absorption thickness expansion coefficient) of the wood-based material. When the water-soluble synthetic resin (B) comprises a polyvinyl alcohol-based compound, the wood-based material of the present invention is more excellent in balance among performances such as bending strength under wet condition and water-absorption thickness expansion coefficient.

In the present invention, the inorganic acid ammonium salt (C) comprises at least one selected from ammonium dihydrogen phosphate and ammonium chloride. The aqueous bonding composition of the present invention comprises an inorganic acid ammonium salt (C), and therefore has more excellent curability, thus making it possible to further improve bonding properties (bending strength, bending strength under wet condition, peeling strength, and water-absorption thickness expansion coefficient) of the wood-based material.

Furthermore, the ammonium dihydrogen phosphate and the ammonium chloride has good compatibility with the saccharide (A) and the water-soluble synthetic resin (B), and therefore can inhibit generation of precipitates in the aqueous bonding composition of the present invention, preferably generate no precipitates. Therefore, the aqueous bonding composition of the present invention is more suitable for spraying with an injection device such as spray.

As long as the objective aqueous bonding composition of the present invention is obtainable, the inorganic acid ammonium salt (C) can comprise other ammonium salts other than ammonium dihydrogen phosphate and ammonium chloride. Examples of the other ammonium salts can comprise ammonium sulfate, ammonium fluoride, ammonium bromide, ammonium iodide, ammonium phosphate, and ammonium hydrogen phosphate.

The "inorganic acid ammonium salt(s)" can be used alone or in combination.

It is possible to use commercially available products as the "inorganic acid ammonium salt".

In the present invention, the aqueous bonding composition preferably has (D) a metal salt, and the metal salt (D) preferably comprises magnesium chloride.

When the aqueous bonding composition of the present invention has a metal salt (D), a wood-based material of the present invention can be cured by heating and pressurizing at a lower temperature for a shorter time. When the metal salt (D) comprises magnesium chloride, the wood-based material produced by using the aqueous bonding composition of the present invention can be cured by heating and pressurizing at a lower temperature for a shorter time, thus making it possible to exhibit a lower water-absorption thickness expansion coefficient and a higher bending strength under wet condition.

The metal salt (D) preferably comprises magnesium chloride, and can further comprise "other metal salts" as long as the advantageous effects of the present invention are not lost.

Examples of other metal salts include:

potassium salts such as potassium sulfate, potassium hydrogen sulfate, potassium halide (for example, potassium fluoride, potassium chloride, potassium bromide, and potassium iodide), potassium phosphate, potassium hydrogen phosphate, and potassium dihydrogen phosphate;

calcium salts such as calcium sulfate, calcium hydrogen sulfate, calcium halide (for example, calcium fluoride, calcium chloride, calcium bromide, and calcium iodide), calcium phosphate, calcium hydrogen phosphate, and calcium dihydrogen phosphate;

sodium salts such as sodium sulfate, sodium hydrogen sulfate, sodium halide (for example, sodium fluoride, sodium chloride, sodium bromide, and sodium iodide), sodium phosphate, sodium hydrogen phosphate, and sodium dihydrogen phosphate; and magnesium salts such as magnesium sulfate, magnesium hydrogen sulfate, magnesium halide (for example, magnesium fluoride, magnesium bromide, and magnesium iodide), magnesium phosphate, magnesium hydrogen phosphate, and magnesium dihydrogen phosphate.

The metal salt (D) is preferably a metal salt of a strong acid, and more preferably a metal halide and a metal salt of sulfuric acid. When the metal salt (D) is a metal salt of a strong acid, the pH of the aqueous bonding composition of the present invention can become in a range of 1 to 6. In the present invention, the pH of the aqueous bonding composition is preferably in a range of 1 to 6, particularly preferably 2 to 5, and most preferably 3 to 4.5.

A wood-based material produced by using the aqueous bonding composition, which comprises a metal salt (D) of a strong acid and exhibits pH in the above range, can be cured by heating and pressurizing at a lower temperature for a shorter time.

These metal salt(s) (D) can be used alone or in combination.

It is possible to use commercially available products as the metal salt (D).

Each amount of the components (A) to (C) to be comprised and the component (D) which can be optionally comprised is not particularly limited as long as the objective aqueous bonding composition of the present invention is obtainable. The composition (or formulation) of each component will be shown below, but the numerical value of each component is defined as a value calculated in terms of the dehydrated solid content.

The component (A) is preferably comprised in an amount of 60 to 90 parts by weight, more preferably 70 to 90 parts by weight, and particularly preferably 75 to 85 parts by weight, based on 100 parts by weight of the total amount of the components (A) to (C) when the component (D) is not comprised, or based on 100 parts by weight of the total amount of the components (A) to (D) when the component (D) is comprised.

The component (B) is preferably comprised in an amount of 5 to 20 parts by weight, more preferably 5 to 15 parts by weight, and particularly preferably 5 to 10 parts by weight, based on 100 parts by weight of the total amount of the components (A) to (C) when the component (D) is not comprised, or based on 100 parts by weight of the total amount of the components (A) to (D) when the component (D) is comprised.

The component (C) is preferably comprised in an amount of 2 to 15 parts by weight, more preferably 5 to 15 parts by weight, and particularly preferably 7 to 15 parts by weight, based on 100 parts by weight of the total amount of the components (A) to (C) when the component (D) is not comprised, or based on 100 parts by weight of the total amount of the components (A) to (D) when the component (D) is comprised.

The component (D) is preferably comprised in an amount of 5 to 15 parts by weight, more preferably 7 to 15 parts by weight, and particularly preferably 8 to 12 parts by weight, based on 100 parts by weight of the total amount of the components (A) to (D).

If the saccharide (A) is comprised in an amount of 60 to 90 parts by weight, the wood-based material produced by using the aqueous bonding composition of the present invention can have more excellent bending strength and bending strength under wet condition.

If the water-soluble synthetic resin (B) is comprised in an amount of 5 to 20 parts by weight, the wood-based material produced by using the aqueous bonding composition of the present invention can be more excellent in balance among properties such as bending strength under wet condition and water-absorption thickness expansion coefficient.

If the inorganic acid ammonium salt (C) is comprised in an amount of 2 to 15 parts by weight, curability of the aqueous bonding composition of the present invention is improved, so that the wood-based material can be cured by heating and pressurizing at a lower temperature for a shorter time.

If the metal salt (D) is comprised in an amount of 5 to 15 parts by weight, the wood-based material of the present invention is more excellent in low-temperature curability.

The aqueous bonding composition according to the present invention comprises water, and has a form of an aqueous solution in which all of the above-mentioned components (A) to (C) and the component (D) which can be optionally comprised are dissolved in water, or a form of a dispersion in which at least one of the above-mentioned components (A) to (C) and the component (D) which can be optionally comprised is dispersed without being dissolved in water.

The "water" as used herein is generally called "water" and is not particularly limited as long as the objective aqueous bonding composition of the present invention is obtainable. Examples thereof can include distilled water, deionized water, pure water, tap water, and industrial water.

The amount of the water contained in the aqueous bonding composition according to an embodiment of the present invention is not particularly limited, as long as the objective aqueous bonding composition of the present invention is obtainable, and is appropriately selected considering the components (A) to (C) to be used, the component (D) which can be optionally used, and additives.

The aqueous bonding composition according to an embodiment of the present invention preferably comprises water in an amount of 50 to 250 parts by weight, more preferably 70 to 200 parts by weight, and particularly preferably 100 to 200 parts by weight, based on 100 parts by weight of the total amount of the components (A) to (C) when the component (D) is not comprised, and based on 100 parts by weight of the total amount of the components (A) to (D) when the component (D) is comprised.

The aqueous bonding composition according to the present invention is in a form of an aqueous solution or an aqueous dispersion, so that it is easy to apply or spray onto an adherend. Furthermore, the aqueous bonding composition according to the present invention is excellent in protection of the earth environment and protection of the work environment of workers because an organic solvent is not preferably used.

The aqueous bonding composition according to an embodiment of the present invention can include other components. Examples of other components can comprise a storage stabilizer, a thickener, a preservative, a mildew-proofing agent, a rust preventive, and a dispersion stabilizer.

Examples of the storage stabilizer can include polycarboxylic acid such as citric acid, malic acid, tartaric acid, succinic acid, and erythorbic acid.

The thickener is used to prevent a viscosity of the composition from decreasing in the case of pressurizing and heating the composition, and is not particularly limited as long as the objective aqueous bonding composition of the present invention is obtainable. The thickener is classified, for example, into an organic thickener and an inorganic thickener.

Examples of the inorganic thickener can include clay, talc, and silica.

Examples of the organic thickener can include carboxymethyl cellulose, and vegetable flours such as wheat flour, cornstarch, top-grade rice flour, walnut flour, and coconut flour.

These thickeners can be used alone or in combination.

The aqueous bonding composition according to an embodiment of the present invention can be produced by addition of the above-mentioned components (A) to (C) and the optional component (D), and if necessary, other components and water, followed by stirring. The order of the addition of the respective components (A) to (D), water, and the other components, the method for addition, and the stirring method are not particularly limited as long as the objective aqueous bonding composition of the present invention is obtainable.

Examples of materials obtainable by using the aqueous bonding composition of the present invention comprise a wood-based material and an inorganic molded member which is obtainable by molding materials such as calcium silicate, gypsum, rock wool, concrete, cement, mortar, and slate into various forms (plate, block, etc.).

In the present invention, the wood-based material is the most suitable.

The wood-based material according to the present invention is a mixture comprising the aqueous bonding composition according to an embodiment of the present invention and a wood-based element (raw material) (for example, wood-based fibers, small pieces and veneers, and fibers, small pieces and veneers of herbaceous plants, etc.). The wood-based material is produced by applying or spraying the aqueous bonding composition according to an embodiment of the present invention onto a wood-based element, and heating, bonding and molding the wood-based element.

Examples of the wood-based element (raw material) comprise sawn boards, veneers, wood-based strands, wood-based chips, wood-based fibers and vegetable fibers, and the like obtainable by grinding or cutting woods.

Examples of the wood-based material comprise laminated woods, plywoods, particle boards, fiber boards, medium-density fiberboards (MDF), and the like obtainable by bonding the wood-based element using an adhesive.

The aqueous bonding composition according to an embodiment of the present invention can be used to bond various adherends (for example, papers, wood-based fibers, plywoods, etc.), and can be suitably used to produce the above-mentioned wood-based material.

In the case of producing the wood-based material by molding, manufacturing conditions such as coating amount of the aqueous bonding composition, coating method, molding pressure, molding temperature, and molding time are appropriately selected according to the type, shape and size of the wood-based element, and the size of the wood-based material to be produced. The manufacturing conditions are not particularly limited as long as the objective wood-based material of the present invention is obtainable. However, considering the production efficiency, a method for spraying the aqueous bonding composition onto the wood-based element using a spray etc. is preferable as the coating method.

The aqueous bonding composition is preferably applied in an amount of 5 to 80 parts by weight, more preferably 10 to 60 parts by weight, and particularly preferably 15 to 30 parts by weight, based on 100 parts by weight of the total weight of the (dried) wood-based element and the aqueous bonding composition (solid content).

The coating method of the aqueous bonding composition is preferably a coating method using a roll, a brush and the like, a spraying method using a spray and the like, a method of impregnating with the aqueous bonding composition, or the like.

The molding pressure is preferably in a range of 0.5 to 6.0 MPa. If the molding pressure is 6.0 MPa or less, the wood-based material is scarcely degraded since too large pressure is not applied. If the molding pressure is 0.5 MPa or more, it is possible to satisfactorily bond the wood-based element.

The molding temperature is preferably in a range of 140 to 230° C., more preferably 140 to 200° C., and particularly preferably 140 to 180° C. If the molding temperature is 230° C. or lower, low energy consumption is achieved because of non-excessive temperature, and also the wood-based material is scarcely degraded. If the molding is carried out at a temperature of 140° C. or more, bonding can proceed within an appropriate time.

The molding time is preferably in a range of 3 to 10 minutes, more preferably 3 to 9 minutes, and particularly preferably 3 to 7 minutes. If the molding time is 10 minutes or less, low energy consumption is achieved because of non-excessive time, and also the wood-based material is scarcely degraded. If the molding time is 3 minutes or more, an appropriate bonding time is secured, thus making it possible to secure appropriate bonding strength.

The wood-based material thus obtained in the above-mentioned manner can be used for various applications, for example, building materials, furniture and the like, as a conventional wood-based material.

EXAMPLES

The present invention will be described below by way of Examples and Comparative Examples. It should be noted, however, these Examples are intended to describe the present invention and the present invention is not limited thereto.

The following components were prepared as components of aqueous bonding compositions. Trade name and manufacturer's name are shown in parentheses. Parts are by weight.

(A) Saccharide
(A-1) Sucrose (manufactured by Wako Pure Chemical Industries, Ltd.)
(A-2) Waste molasses (Hayashi shokai, Molasses H (trade name))
(A-3) Ice molasses (Hayashi shokai, Ice molasses (trade name))
(B) Water-Soluble Synthetic Resin
(B-1) Polyvinyl alcohol (manufactured by Kuraray Co., Ltd., PVA 203 (trade name))
(B-2) Butenediol-modified polyvinyl alcohol (manufactured by The Nippon Synthetic Chemical Industry Co., Ltd., G polymer (trade name))
(B-3) Sulfonic acid-modified polyvinyl alcohol (manufactured by The Nippon Synthetic Chemical Industry Co., Ltd., Gohsenx L3266 (trade name))
(B-4) Acetoacetyl group-modified polyvinyl alcohol (manufactured by The Nippon Synthetic Chemical Industry Co., Ltd., Gohsenx Z320 (trade name))
(B-5) Carboxylic acid-modified polyvinyl alcohol (manufactured by The Nippon Synthetic Chemical Industry Co., Ltd., Gohsenx T330 (trade name))
(B-6) Amino group-modified polyvinyl alcohol (manufactured by The Nippon Synthetic Chemical Industry Co., Ltd., Gohsenx K434 (trade name))
(B'-7) Diethylene glycol monomer (manufactured by Wako Pure Chemical Industries, Ltd.)
(C) Inorganic Acid Ammonium Salt
(C-1) Ammonium dihydrogen phosphate (Wako Pure Chemical Industries, Ltd.)
(C-2) Ammonium chloride (Wako Pure Chemical Industries, Ltd.) (C'-3) Diammonium hydrogen phosphate (Wako Pure Chemical Industries, Ltd.)
(C'-4) Paratoluenesulfonic acid (Wako Pure Chemical Industries, Ltd.)
(D) Metal Salt
(D-1) Magnesium chloride (Wako Pure Chemical Industries, Ltd.)

Aqueous bonding compositions of Examples 1 to 10 and Comparative Examples 11 to 19 were produced in the following manner.

Example 1: Production of Aqueous Bonding Composition (A-1) sucrose (81.6 parts), 8.2 parts of (B-1) polyvinyl alcohol, 10.2 parts of (C-1) ammonium dihydrogen phosphate (Wako Pure Chemical Industries, Ltd.) were mixed and the mixture was added to distilled water, followed by dissolving the mixture with stirring at normal temperature to obtain an aqueous bonding composition of Example 1.

With respect to the aqueous bonding composition of Example 1, as shown in Table 1, the total weight of the components (A-1), (B-1), and (C-1) was 100 parts, and the weight of the water was 186 parts.

The numerical value of the component (A-1) shown in Table 1 indicates the solid content only.

Examples 2 to 10 and Comparative Examples 11 to 19: Production of Aqueous Bonding Composition Each composition of the aqueous bonding compositions of Examples 2 to 10 and Comparative Examples 11 to 19 is shown in Table 1 and Table 2.

The aqueous bonding compositions were produced by using the components (A), (B), and (C) used in Example 1 and (D) a metal salt ((D-1) magnesium chloride).

In the same manner as in Example 1, except that the components were changed to the components and amounts thereof shown in Table 1 and Table 2, the aqueous bonding compositions of Examples 2 to 10 and Comparative Examples 11 to 19 were produced.

The numerical values of the components (A-2) waste molasses and (A-3) ice molasses shown in Tables 1 and 2 indicate the solid contents only, and the water is not included.

TABLE 1

| Composition | (Examples) | 1 | 2 | 3 | 4 | 5 | 6 | 7 | 8 | 9 | 10 |
|---|---|---|---|---|---|---|---|---|---|---|---|
| (A) | (A-1) | 81.6 | 74.1 | 79.7 | 74.1 | 74.1 | 74.1 | 74.1 | 74.1 | | |
| | (A-2) | | | | | | | | | 74.1 | |
| | (A-3) | | | | | | | | | | 74.1 |
| (B) | (B-1) | 8.2 | 7.4 | 8.0 | | | | | | 7.4 | 7.4 |
| | (B-2) | | | | 7.4 | | | | | | |
| | (B-3) | | | | | 7.4 | | | | | |
| | (B-4) | | | | | | 7.4 | | | | |
| | (B-5) | | | | | | | 7.4 | | | |
| | (B-6) | | | | | | | | 7.4 | | |
| | (B'-7) | | | | | | | | | | |
| (C) | (C-1) | 10.2 | 9.3 | | 9.3 | 9.3 | 9.3 | 9.3 | 9.3 | 9.3 | 9.3 |
| | (C-2) | | | 2.4 | | | | | | | |
| | (C'-3) | | | | | | | | | | |
| | (C'-4) | | | | | | | | | | |
| (D) | (D-1) | | 9.3 | 10.0 | 9.3 | 9.3 | 9.3 | 9.3 | 9.3 | 9.3 | 9.3 |
| Water | | 186 | 186 | 186 | 186 | 186 | 186 | 186 | 186 | 186 | 186 |
| pH | | 3.9 | 3.2 | 3.2 | 0 | 0 | 0 | 0 | 0 | 3.8 | 3.9 |
| Total solid content of adhesive (%) | | 35 | 35 | 35 | 35 | 35 | 35 | 35 | 35 | 35 | 35 |

TABLE 2

| | | (Comparative Examples) | | | | | | | | |
|---|---|---|---|---|---|---|---|---|---|---|
| Composition | | 11 | 12 | 13 | 14 | 15* | 16* | 17 | 18 | 19 |
| (A) | (A-1) | 88.9 | 80.0 | 81.6 | | 81.6 | 81.1 | | | 74.1 |
| | (A-2) | | | | | | | 80.0 | | |
| | (A-3) | | | | | | | | 80.0 | |
| (B) | (B-1) | | | 8.2 | 80.0 | 8.2 | 8.1 | | | |
| | (B-2) | | | | | | | | | |
| | (B-3) | | | | | | | | | |
| | (B-4) | | | | | | | | | |
| | (B-5) | | | | | | | | | |
| | (B-6) | | | | | | | | | |
| | (B'-7) | | | | | | | | | 7.4 |
| (C) | (C-1) | 11.1 | 10.0 | | 10.0 | | | 10.0 | 10.0 | 9.3 |
| | (C-2) | | | | | | | | | |
| | (C'-3) | | | | | 10.2 | | | | |
| | (C'-4) | | | | | | 10.8 | | | |
| (D) | (D-1) | | 10.0 | 10.2 | 10.0 | | | 10.0 | 10.0 | 9.3 |
| Water | | 186 | 186 | 186 | 186 | 186 | 186 | 186 | 186 | 186 |
| pH | | | | | | | | | | |
| Total solid content of adhesive (%) | | 35 | 35 | 35 | 15 | 35 | 35 | 35 | 35 | 35 |

*Precipitation was observed.

Using the above-mentioned aqueous bonding compositions of Examples 1 to 10 and Comparative Examples 11 to 19, wood-based materials (particle boards) of Examples 20 to 31 and Comparative Examples 32 to 41 were produced.

Example 20: Production of Wood-Based Material

Wood-based fibers of coniferous tree, which passed through a 60 mesh sieve, were used as a wood-based element (raw material). The aqueous adhesive composition of Example 1 was uniformly applied onto 80 parts of the wood-based element using a spray so that the solid content becomes 20 parts. The coated wood-based element was dried in an oven at 80° C. for 2 hours. After press molding at a heating platen temperature of 170° C. under a pressure of 4 MPa for 9 minutes, a wood-based material (particle board) having a thickness of 9 mm and a density of 0.8 g/cm$^3$ of Example 20 was produced. The composition and manufacturing conditions used in Example 20 are shown in Table 3.

Examples 21 to 31 and Comparative Examples 32 to 41: Production of Wood-Based Material Compositions and manufacturing conditions used to produce particle boards of Examples 21 to 31 and Comparative Examples 32 to 41 are shown in Tables 3 to 5.

In the same manner as in Example 20, except that the aqueous adhesive composition used in Example 20, the amount thereof, the amount of the wood-based element, and the press molding conditions (heating platen temperature, pressure, and molding time) were changed to the values shown in Tables 3 to 5, wood-based materials (particle boards) of Examples 21 to 31 and Comparative Examples 32 to 41 were produced.

However, the aqueous bonding compositions of Comparative Examples 15 and 16 could not be sprayed onto the wood-based element using a spray because ammonium dihydrogen phosphate and paratoluenesulfonic acid were precipitated. Since the wood-based materials of Comparative Examples 37 and 38 could not be produced, the performances were not evaluated, as shown in Table 5.

Except for Comparative Examples 37 and 38, other conditions such as the size and density of each particle board are the same as those of the particle board of Example 20.

Regarding the particle boards thus obtained, the respective bending strength (N/mm$^2$), bending strength under wet condition (B test) (N/mm$^2$), water-absorption thickness expansion coefficient (%), and peeling strength (N/mm$^2$) were measured in accordance with JISA5908:2003.

The above-mentioned particle board corresponds to "non-polished board" of "base particle board" disclosed in JISA5908:2003. "Bending strength(s)" in a width direction is almost the same as that (or those) in a length direction, and smaller values were employed as the results of the "bending strength" and the "bending strength under wet condition".

Evaluation criteria of each test are as follows.
<Evaluation Criteria for Bending Strength>
A: Strength is 16 N/mm$^2$ or more.
B: Strength is 13 N/mm$^2$ or more and less than 16 N/mm$^2$.
C: Strength is less than 13 N/mm$^2$.
<Evaluation Criteria for Bending Strength Under Wet Condition>
A: Strength is 7.0 N/mm$^2$ or more.
B: Strength is 6.5 N/mm$^2$ or more and less than 7.0 N/mm$^2$.
C: Strength is less than 6.5 N/mm$^2$.
<Evaluation Criteria for Water-Absorption Thickness Expansion Coefficient>
A: Expansion coefficient is 6% or less.
B: Expansion coefficient is more than 6% and 12% or less.
C: Expansion coefficient exceeds 12% or particle board collapses.
<Evaluation Criteria for Peeling Strength>
A: Strength is 1.0 N/mm$^2$ or more.
B: Strength is more than 0.3 N/mm$^2$ and less than 1.0 N/mm$^2$.
C: Strength is 0.3 N/mm$^2$ or less.

TABLE 3

| Wood-based material | Examples | 20 | 21 | 22 | 23 | 24 | 25 |
|---|---|---|---|---|---|---|---|
| Composition | | | | | | | |
| Adhesive composition | (Examples) | 1 | 2 | 2 | 3 | 4 | 4 |
| | Parts by weight | 20 | 17 | 20 | 20 | 17 | 20 |
| Wood-based element | Parts by weight | 80 | 83 | 80 | 80 | 83 | 80 |
| Molding conditions | | | | | | | |
| Temperature | ° C. | 170 | 170 | 170 | 170 | 170 | 170 |
| Time | Minutes | 9 | 9 | 9 | 9 | 9 | 9 |
| Pressure | MPa | 4 | 4 | 4 | 4 | 4 | 4 |
| Performances | | | | | | | |
| Bending strength (N/mm$^2$) | | 28 | 17.4 | 16.3 | 20.4 | 19.8 | 20.7 |
| | | A | A | A | A | A | A |
| Bending strength under wet condition (N/mm$^2$) | | 9.8 | 6.7 | 7.2 | 10.6 | 7.7 | 8.8 |
| | | A | B | A | A | A | A |
| Water-absorption thickness expansion coefficient (%) | | 10.5 | 11.5 | 5.3 | 11.5 | 11.5 | 5.8 |
| | | B | B | A | B | B | A |
| Peeling strength (N/mm$^2$) | | 0.9 | 0.9 | 1.2 | 1.2 | 1.2 | 1.1 |
| | | B | B | A | A | A | A |

TABLE 4

| Wood-based material | Examples | 26 | 27 | 28 | 29 | 30 | 31 |
|---|---|---|---|---|---|---|---|
| Composition | | | | | | | |
| Adhesive composition | (Examples) | 5 | 6 | 7 | 8 | 9 | 10 |
| | Parts by weight | 20 | 20 | 20 | 20 | 20 | 20 |
| Wood-based element | Parts by weight | 80 | 80 | 80 | 80 | 80 | 80 |
| Molding conditions | | | | | | | |
| Temperature | ° C. | 170 | 170 | 170 | 170 | 170 | 170 |
| Time | Minutes | 9 | 9 | 9 | 9 | 9 | 9 |
| Pressure | MPa | 4 | 4 | 4 | 4 | 4 | 4 |
| Performances | | | | | | | |
| Bending strength (N/mm$^2$) | | 15.3 | 13.3 | 16.3 | 16.5 | 17.2 | 17.6 |
| | | B | B | A | A | A | A |
| Bending strength under wet condition (N/mm$^2$) | | 7.5 | 6.7 | 7.3 | 8.0 | 8.0 | 7.5 |
| | | A | B | A | A | A | A |
| Water-absorption thickness expansion coefficient (%) | | 8.8 | 10.8 | 9.1 | 7.3 | 7.3 | 6.8 |
| | | B | B | B | B | B | B |
| Peeling strength (N/mm$^2$) | | 1.2 | 1.0 | 1.1 | 1.2 | 1.1 | 1.1 |
| | | A | A | A | A | A | A |

TABLE 5

| | | Comparative Examples | | | | | | | | | |
|---|---|---|---|---|---|---|---|---|---|---|---|
| Wood-based material | | 32 | 33 | 34 | 35 | 36 | 37 | 38 | 39 | 40 | 41 |
| Composition | | | | | | | | | | | |
| Adhesive composition | (Comparative Examples) | 11 | 12 | 12 | 13 | 14 | 15 | 16 | 17 | 18 | 19 |
| | Parts by weight | 20 | 17 | 20 | 20 | 20 | — | — | 20 | 20 | 20 |
| Wood-based element | Parts by weight | 80 | 83 | 80 | 80 | 80 | — | — | 80 | 80 | 80 |
| Molding conditions | | | | | | | | | | | |
| Temperature | ° C. | 170 | 170 | 170 | 170 | 170 | 170 | 170 | 170 | 170 | 170 |
| Time | Minutes | 9 | 9 | 9 | 9 | 9 | 9 | 9 | 9 | 9 | 9 |
| Pressure | MPa | 4 | 4 | 4 | 4 | 4 | 4 | 4 | 4 | 4 | 4 |
| Performances | | | | | | | | | | | |
| Bending strength (N/mm$^2$) | | 22.4 | 10.5 | 14.4 | 9.6 | 5.8 | — | — | 15.5 | 14.5 | 15.4 |
| | | A | C | B | C | C | | | B | B | B |
| Bending strength under wet condition (N/mm$^2$) | | 2.4 | 3.4 | 3.5 | ** | 0.4 | — | — | 3.8 | 3.2 | 1.7 |
| | | C | C | C | C | C | | | C | C | C |
| Water-absorption thickness expansion coefficient (%) | | 18.7 | 11.7 | 8.5 | ** | 34.3 | — | — | 15.9 | 14.6 | 23.7 |
| | | C | B | B | C | C | | | C | C | C |
| Peeling strength (N/mm$^2$) | | 0.9 | 0.8 | 0.8 | 0.3 | 0.2 | — | — | 0.9 | 0.9 | 0.7 |
| | | B | B | B | C | C | | | B | B | B |

** The wood-based material was collapsed.

As shown in Tables 3 and 4, the wood-based materials of Examples 20 to 31 produced by using the aqueous bonding compositions of Examples 1 to 10 were excellent in bending strength, bending strength under wet condition, and peeling strength, and exhibited a small water-absorption thickness expansion coefficient, regardless of being molded at a comparatively low temperature of 170° C. These wood-based materials were also excellent in balance among these performances. Therefore, the bonding composition according to the present invention can be suitably used to produce a wood-based material by being applied to a wood-based element.

To the contrary, as shown in Table 5, the wood-based materials of Comparative Examples 32 to 41 produced by using the aqueous bonding compositions of Comparative Examples 11 to 19 have a problem with regard to any one of bending strength, bending strength under wet condition, peeling strength, and water-absorption thickness expansion coefficient. Particularly, these wood-based materials are inferior in performances such as bending strength under wet condition and water-absorption thickness expansion coefficient.

As previously mentioned, the aqueous bonding compositions of Comparative Examples 15 and 16 cannot be sprayed onto the wood-based element using the spray. Therefore, the performances of the wood-based materials of Comparative Examples 37 and 38 were not evaluated, as shown in Table 5.

Accordingly, the aqueous bonding compositions of Comparative Examples 11 to 19 are unsatisfactory to produce the wood-based material.

These results revealed that an aqueous bonding composition comprising the above-mentioned three components (A) to (C) is useful to bond a wood-based element (raw material), and an excellent wood-based material can be produced by molding the wood-based element using the same.

INDUSTRIAL APPLICABILITY

The present invention can provide an aqueous bonding composition which is useful for bonding a wood-based element. A wood-based material can be efficiently produced by molding the wood-based element using the aqueous bonding composition according to the present invention.

The invention claimed is:

1. A wood-based material which is
a wood-based element, and
an aqueous bonding composition comprising (A) a saccharide; (B) a water-soluble synthetic resin; and (C) an inorganic acid ammonium salt selected from ammonium dihydrogen phosphate or ammonium chloride.

2. The wood-based material, according to claim 1, wherein the water-soluble synthetic resin (B) comprises a polyvinyl alcohol-based compound.

3. The wood-based material, according to claim 1, which further comprises (D) a metal salt, and wherein the metal salt (D) comprises magnesium chloride.

4. The wood-based material, according to claim 1, wherein the water-soluble synthetic resin (B) is present in an amount of 5 to 20 parts by weight based on 100 parts by weight of the total weight of the components (A) to (D).

* * * * *